Figure 6:
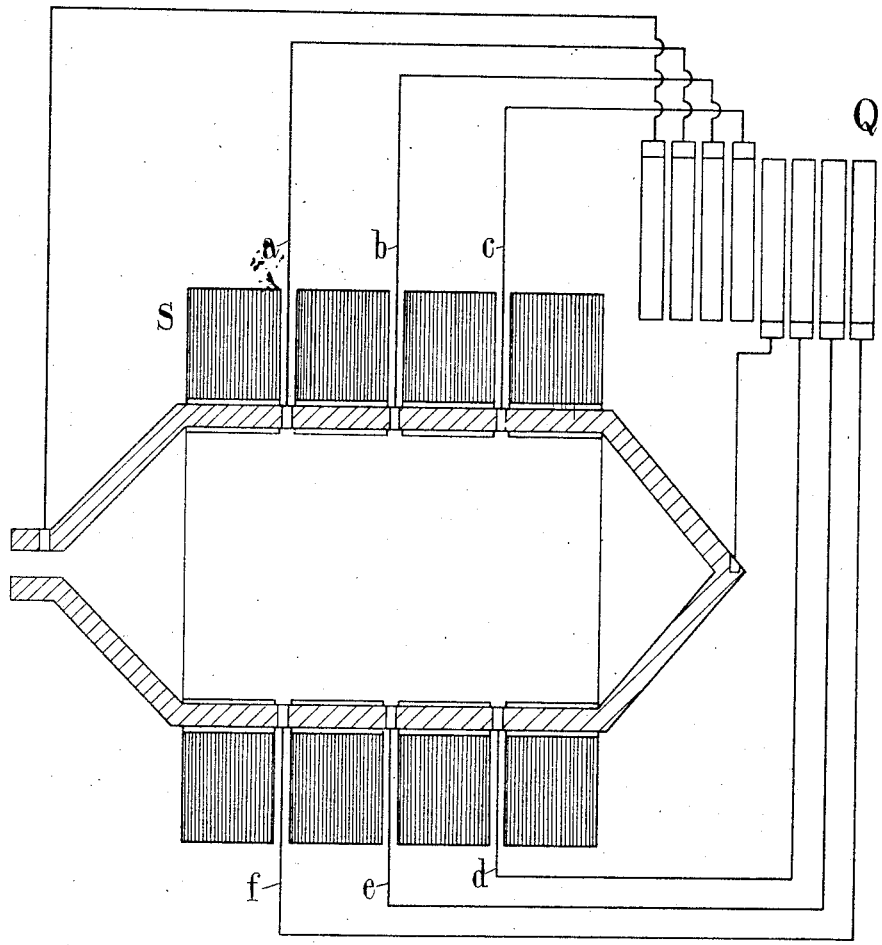

June 15, 1926. 1,588,749
M. KOSTENKO ET AL
ALTERNATING CURRENT COMMUTATOR MACHINE
Filed June 30, 1923   3 Sheets-Sheet 1
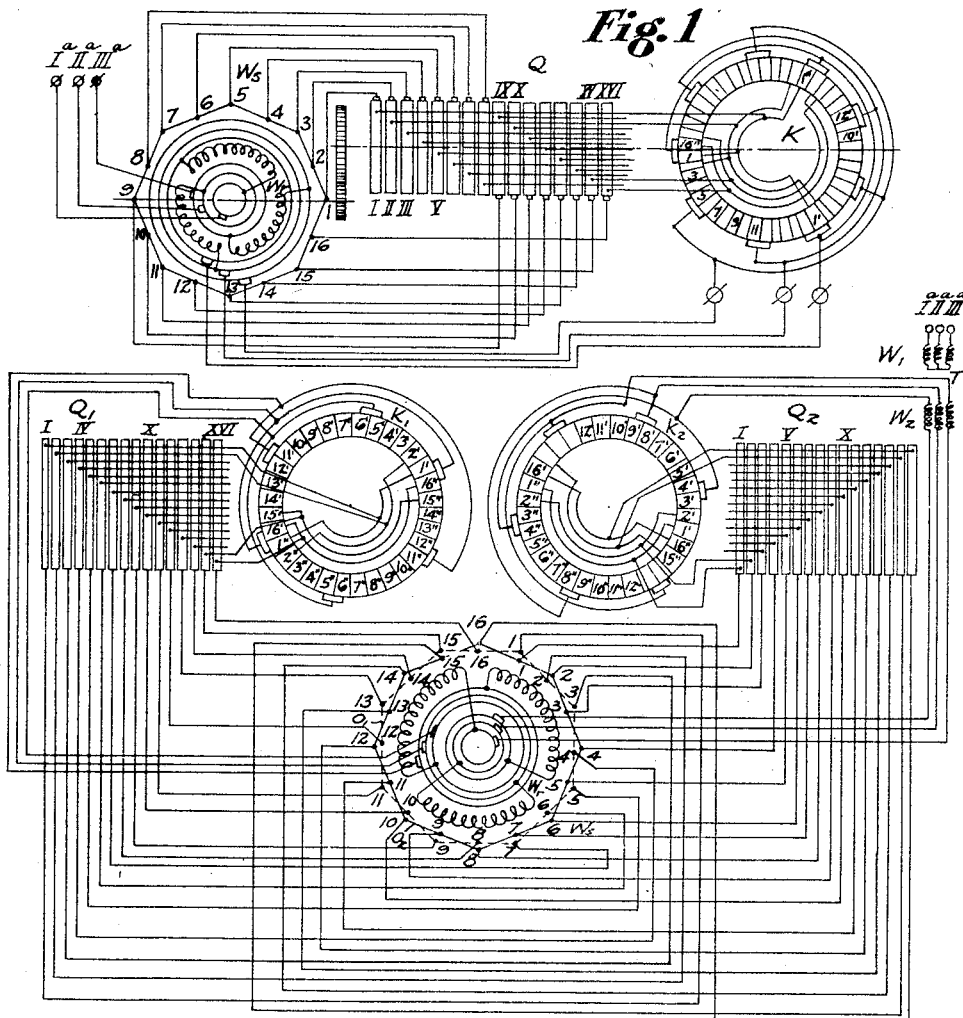
Fig. 1
Fig. 2
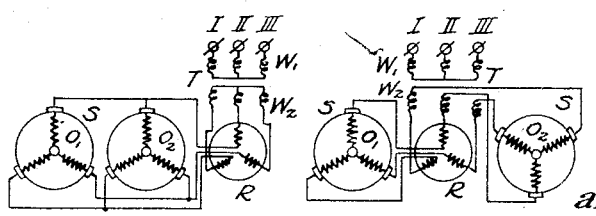
Fig. 2b   Fig. 2a
M. Kostenko
and N. Japolsky
INVENTORS
BY 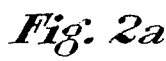
ATTORNEYS.

June 15, 1926.
M. KOSTENKO ET AL
ALTERNATING CURRENT COMMUTATOR MACHINE
1,588,749
Filed June 30, 1923     3 Sheets-Sheet 2
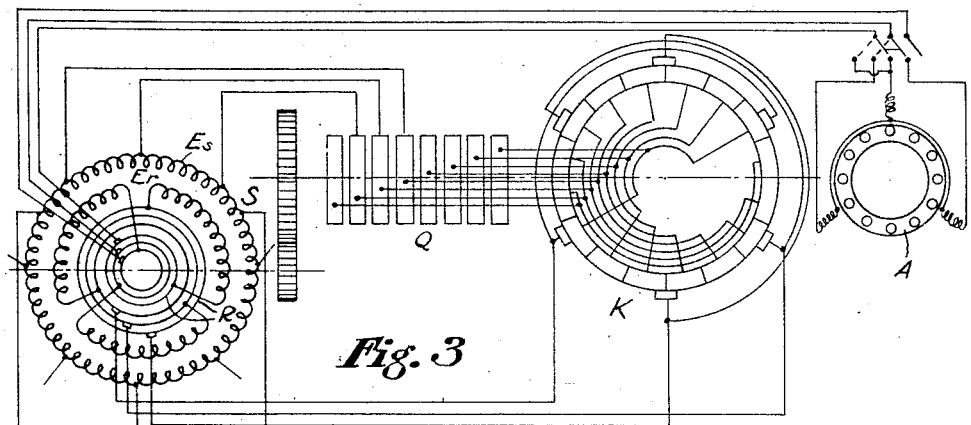
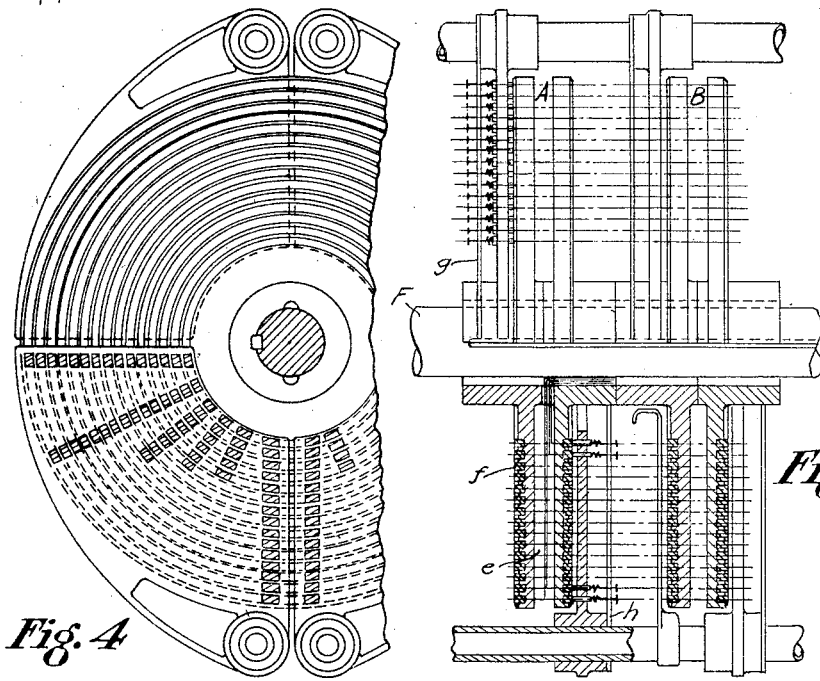
M. Kostenko and N. Japolsky  INVENTORS
BY Marks & Clerk
ATTORNEYS.

Inventors
M. Kostenko
M. Japolsky

Patented June 15, 1926.

1,588,749

UNITED STATES PATENT OFFICE.

MICHAEL KOSTENKO AND NICOLAS JAPOLSKY, OF LONDON, ENGLAND.

ALTERNATING-CURRENT COMMUTATOR MACHINE.

Application filed June 30, 1923. Serial No. 648,787.

In alternating-current commutator-machines great difficulties are encountered in the construction of the commutator when high speeds are required, inasmuch as the commutator has to work under more difficult conditions than those to which the commutators of continuous current machines are subjected.

With the usual alternating-current commutator-machines, the permissible voltage between two consecutive segments of the commutator is less than the voltage allowed with continuous current machines and consequently the area of the surface of the commutator, per unit of power is greater which causes the machine to be heavier and more expensive than a continuous current machine of the same power.

Besides, with said alternating-current machines, the self-inductive electro-motive force generated by short circuit of a section by means of a brush, reaches a considerable value consequently commutation takes place under more difficult conditions than with continuous current machines.

The purpose of the present invention is to remove these disadvantages. The characteristic feature of the present invention consists in that the stator windings are connected through slip-rings with the segments of a commutator, whose speed is lower than the speed of the rotor and whose brushes are connected through slip-rings with the rotor windings.

The accompanying drawings represent, by way of example, several constructional forms of the present invention.

Figs. 1, 2 and 3, diagrammatically indicate different constructional forms of the invention, applied by way of example to machines having only one pair of magnetic poles.

Fig. 2$^a$ is a simplified diagram intended to indicate the same arrangement as that of Fig. 2.

Fig. 2$^b$ is a simplified diagram, analogous to Fig. 2$^a$, and indicating a modification of the electrical connection in Fig. 2.

Figs. 4, 5 and 6 show constructional details.

In the constructional form illustrated in Fig. 1, the windings 1, 2, 3, 4, 5, 6, 7, etc. up to 16 of the stator $W_s$ are each connected with a brush pressing against one of the rings I, II, III, etc., up to XVI constituting the slip rings Q. Each of these rings is connected with three of the segments 1, 2, 3, etc., up to 16, 1', 2', 3', etc. of the commutator K.

Thus the ring III is connected to the segments 3, 3', 3'' separated by 120° and so on. The commutator K and the slip rings Q are fixed on a common shaft and revolve at one third of the speed of the rotor R, the commutator being driven from the rotor through reduction gearing. Nine stationary brushes press upon the periphery of the commutator K, and are respectively connected in sets of three with three other stationary brushes, each pressing on one of three slip rings, which rotate with the rotor R. These latter slip rings are indicated in Fig. 1 by the three exterior circles of the six circles representing the slip rings B.

The terminals I$^a$, II$^a$, III$^a$ of the machine are respectively connected, by means of three brushes, with the three remaining slip rings B, which also rotate with the rotor. Each of the three rotor windings has its extremities respectively connected to one of the rings B represented by the three interior circles, and to one of the rings B represented by the three exterior circles.

In this constructional form, the electrostatic potential upon the periphery of the commutator K varies as a curve whose wavelength or period is one third of the complete circumference of the commutator. However, it is possible to arrange that the complete circumference of the commutator shall correspond to any other plural number of periods of the electrostatic potential curve. This figure refers to one pair of poles for the stator and rotor fields; but in the case of a multipolar machine the ratio between the speed of rotation of the commutator and the speed of rotation of the rotor must be equal to the ratio between the number of pairs of magnetic poles of the machine, and the number of periods of the electrostatic potential curve upon the commutator corresponding to the complete circumference of the said commutator.

By suitably arranging the order of the connections between the commutator, slip rings and the stator and rotor, it is possible to arrange that the commutator should either rotate in the same direction as the rotor, or in the opposite direction to that of the rotor.

It will be observed that between two consecutive segments of the commutator K there may be connected only a fraction of a conductor bar of the stator. This is particularly advantageous for high speed machines of considerable voltage, in which machines the voltage induced in each conductor bar of the winding may exceed the voltage admissible between consecutive segments of the commutator. In this case, the connection of the stator winding with the brushes of the slip rings Q may then be made to pass through the ventilation channels as indicated in Fig. 6 which shows tappings made to intermediate points of the conductors of the stator winding. The tappings from these points pass in an outward direction through the ventilation channels in the steel stampings constituting the stator armature. As shown in the drawing, these ventilation channels are arranged at right angles to the axis of the stator. Only one turn of the stator winding is indicated in Fig. 6, together with the corresponding slip rings. It is presumed that there will be a plurality of such turns, each turn having a corresponding set of slip rings. The commutator and rotor is not shown.

When a machine of considerable power is employed it may then be profitable to arrange, as shown in Fig. 2, on the stator, two independent windings $O_1$, $O_2$; each of these windings will then be connected with its particular set of slip rings $Q_1$ or $Q_2$, and its particular commutator $K_1$ or $K_2$. In Fig. 2 the connections are arranged in such a way that the independent windings are in series, as indicated in the simplified diagram of Fig. 2ª. These windings could also be connected in parallel, as indicated in Fig. 2ᵇ. In the latter case the current passing through the rotor-rings will be twice that passing through the rotor rings in the case indicated by Figs. 2 and 2ª. In these Figs. 2, 2ª, 2ᵇ the machine is connected to the mains through a transformer T, the primary and secondary windings being indicated by $W_1$ and $W_2$.

The constructional form indicated in Fig. 3 shows an alternating current motor driven by an alternating current commutator generator, in which generator a compensating current is caused to pass through the stator to compensate for the magnetic effect of the rotor current, while the magnetizing or exciting current is supplied by a separate exciter, as described in the specification of my American patent application Serial No. 595,003.

According to the present invention, the stator windings $E_s$ of the generator are connected with the set of slip rings Q which slip rings are themselves connected with the segments of the commutator K, the brushes of which are spaced to correspond with an electric phase displacement of 120°. The rotor windings $E_r$ are constituted by three separate phase windings which are connected with the slip rings R on the rotor, as indicated in the drawing. Upon the rings R of the rotor there press on the one hand the brushes connected to the brushes of the commutator K, and on the other hand the brushes connected to the terminals for supplying alternating current. The generator is excited by a separate exciter B, driven by a motor M.

The generator is connected with an asynchronous motor A, whose speed is to be regulated by changing the frequency of the exciting current of the generator.

When alternating current commutator machines have to be constructed, in which the number of slip rings Q is large, it is inconvenient to arrange same side by side along a shaft, on account of the space that would be taken up. Figs. 4 and 5 show a convenient arrangement of these slip-rings Q. On the shaft F carrying the commutator K and slip rings Q, discs A and B are fixed, each disc having an internal cavity $e$ and being provided on its plane faces with a set of concentric rings $f$, fifteen on each face being shown in the drawings. These rings $f$ act as the slip rings Q in the previous figures. The connections leading to these rings $f$ are passed through grooves left between the shaft F and the discs A and B and are then brought into the cavities $e$ hereinbefore referred to. The brushes for the rings $f$ are held in position by brushholders $g$ and $h$ located respectively on the left hand and right hand sides of the discs A and B.

What we claim is:—

1. A high speed alternating current commutator machine comprising a stator, a continuous winding thereon, a rotating commutator comprising insulated segments, insulated slip rings mechanically secured to said commutator and each electrically connected to a plurality of its segments spaced at equal distances round its circumference, stationary brushes electrically connected to points spaced around the stator winding and bearing upon the slip rings, a second set of stationary brushes bearing on the segments of the commutator, a rotor, a polyphase winding thereon, a set of stationary conductors each corresponding to a phase of said polyphase winding, two sets of slip rings on said rotor, the opposite ends of each phase of the polyphase winding being connected to slip rings of different sets, a third set of stationary brushes, one of such sets of slip rings on the rotor being electrically connected through said third set of stationary brushes with the above-mentioned second set of stationary brushes bearing on the commutator, a fourth set of stationary brushes electrically connected to said set of stationary conductors, and bearing upon the other set of slip rings on the rotor, terminals adapted to be connected to mains for polyphase alternating current, and means for transmitting electricity between said set of stationary conductors and said terminals, and means for causing said commutator to rotate at a sub-multiple of the speed of the rotor in such a way as to maintain synchronism between the stator and rotor magnetic fields.

2. A high speed alternating current commutator machine as claimed in claim 1, comprising ventilation channels through the stator at right angles to its axis, and tappings from intermediate points of the conductors of the stator winding and passing outwards through said ventilation channels, whereby such intermediate points are electrically connected to some of the first-mentioned stationary brushes bearing on the slip rings referred to in claim 1.

In testimony whereof we affix our signatures.

MICHAEL KOSTENKO.
NICOLAS JAPOLSKY.